US008842197B2

(12) United States Patent
Singh

(10) Patent No.: US 8,842,197 B2
(45) Date of Patent: Sep. 23, 2014

(54) AUTOMATIC GENERATION OF METADATA FOR A DIGITAL IMAGE BASED ON AMBIENT CONDITIONS

(75) Inventor: Munindar P. Singh, Cary, NC (US)

(73) Assignee: Scenera Mobile Technologies, LLC, Raleigh, NC (US)

( * ) Notice: Subject to any disclaimer, the term of this patent is extended or adjusted under 35 U.S.C. 154(b) by 888 days.

(21) Appl. No.: 11/164,641

(22) Filed: Nov. 30, 2005

(65) Prior Publication Data

US 2007/0127833 A1 Jun. 7, 2007

(51) Int. Cl.
*H04N 5/76* (2006.01)
*H04N 5/262* (2006.01)
*G06K 9/54* (2006.01)
*G06K 9/60* (2006.01)
*G06F 17/30* (2006.01)

(52) U.S. Cl.
CPC ............................ *G06F 17/30265* (2013.01)
USPC ................ 348/231.3; 348/231.99; 348/231.5; 348/239; 382/305

(58) Field of Classification Search
USPC ................ 348/211.2, 143, 239, 231.5, 231.3; 382/254, 305
See application file for complete search history.

(56) References Cited

U.S. PATENT DOCUMENTS

| 5,345,313 A | 9/1994 | Blank |
| 5,530,793 A | 6/1996 | Watkins et al. |
| 5,587,740 A | 12/1996 | Brennan |
| 5,778,164 A | 7/1998 | Watkins et al. |
| 5,796,394 A | 8/1998 | Wicks et al. |
| 5,806,005 A | 9/1998 | Hull et al. |
| 5,872,925 A | 2/1999 | Han |
| 5,893,037 A | 4/1999 | Reele et al. |
| 5,923,848 A | 7/1999 | Goodhand et al. |
| 5,929,848 A | 7/1999 | Albukerk et al. |
| 5,944,786 A | 8/1999 | Quinn |
| 5,961,589 A | 10/1999 | Hansen |
| 5,964,833 A | 10/1999 | Kikinis |
| 5,969,678 A | 10/1999 | Stewart et al. |
| 5,970,418 A | 10/1999 | Budd et al. |
| 5,983,263 A | 11/1999 | Rothrock et al. |
| 5,995,770 A | 11/1999 | Rochford et al. |
| 6,006,039 A | 12/1999 | Steinberg et al. |
| 6,006,087 A | 12/1999 | Amin |
| 6,014,559 A | 1/2000 | Amin |
| 6,014,688 A | 1/2000 | Venkatraman et al. |
| 6,017,157 A | 1/2000 | Garfinkle et al. |
| 6,018,774 A | 1/2000 | Mayle et al. |
| 6,058,428 A | 5/2000 | Wang et al. |

(Continued)

OTHER PUBLICATIONS

"About Visual Media Explorer," [online] PixController [retrieved on Sep. 12, 2005] Retrieved from the Internet: <URL: http://www.pixcontroller.com/VisualMedia.htm>, 4 pages.

(Continued)

*Primary Examiner* — Michael Osinski

(57) ABSTRACT

A method and system is provided for automatically generating metadata for a digital image based on ambient conditions. Aspects of the preferred embodiment include determining a plurality of ambient conditions associated with a location of a subject of a digital image captured with a mobile image capture device, the ambient conditions existing at a time related to a time of capture of the digital image; aggregating the plurality of ambient conditions into at least one ambient environment descriptor based on user-definable aggregation rules; and associating the ambient environment descriptor with the digital image as metadata.

32 Claims, 6 Drawing Sheets

(56) References Cited

U.S. PATENT DOCUMENTS

| | | | |
|---|---|---|---|
| 6,061,718 A | 5/2000 | Nelson | |
| 6,072,861 A | 6/2000 | Yu | |
| 6,139,197 A | 10/2000 | Banks | |
| 6,141,482 A | 10/2000 | Massarksy | |
| 6,145,046 A | 11/2000 | Jones | |
| 6,147,742 A | 11/2000 | Bell et al. | |
| 6,161,131 A | 12/2000 | Garfinkle | |
| 6,181,878 B1 | 1/2001 | Honda | |
| 6,202,061 B1 | 3/2001 | Khosla et al. | |
| 6,320,668 B1 | 11/2001 | Kim | |
| 6,417,913 B2 | 7/2002 | Tanaka | |
| 6,441,927 B1 | 8/2002 | Dow et al. | |
| 6,442,625 B1 | 8/2002 | Robinson et al. | |
| 6,462,778 B1 * | 10/2002 | Abram et al. | 348/239 |
| 6,480,673 B2 | 11/2002 | Liebenow | |
| 6,489,934 B1 | 12/2002 | Klausner | |
| 6,507,371 B1 | 1/2003 | Hashimoto et al. | |
| 6,512,570 B2 | 1/2003 | Garfinkle et al. | |
| 6,522,292 B1 | 2/2003 | Ellenby et al. | |
| 6,522,418 B2 | 2/2003 | Yokomizo et al. | |
| 6,522,889 B1 | 2/2003 | Aarnio | |
| 6,539,400 B1 | 3/2003 | Bloomfield et al. | |
| 6,563,513 B1 | 5/2003 | Yu et al. | |
| 6,567,619 B1 | 5/2003 | Glogovsky | |
| 6,570,583 B1 | 5/2003 | Kung et al. | |
| 6,571,246 B1 | 5/2003 | Anderson et al. | |
| 6,587,596 B1 | 7/2003 | Haeberli | |
| 6,587,839 B1 | 7/2003 | McIntyre et al. | |
| 6,598,076 B1 | 7/2003 | Chang et al. | |
| 6,600,510 B1 | 7/2003 | Parulski et al. | |
| 6,628,899 B1 | 9/2003 | Kito | |
| 6,629,100 B2 | 9/2003 | Morris et al. | |
| 6,631,011 B2 | 10/2003 | Fredlund et al. | |
| 6,636,733 B1 | 10/2003 | Helferich | |
| 6,664,925 B1 | 12/2003 | Moore et al. | |
| 6,684,088 B1 | 1/2004 | Halahmi | |
| 6,690,883 B2 | 2/2004 | Pelletier | |
| 6,690,955 B1 | 2/2004 | Komiyama | |
| 6,694,133 B1 | 2/2004 | Tobita et al. | |
| 6,697,529 B2 | 2/2004 | Kuniba | |
| 6,701,161 B1 | 3/2004 | Wendling | |
| 6,701,302 B1 | 3/2004 | Schaeffer et al. | |
| 6,701,845 B2 | 3/2004 | Ohmura | |
| 6,710,740 B2 | 3/2004 | Needham | |
| 6,760,583 B2 | 7/2004 | Ito et al. | |
| 6,778,841 B1 | 8/2004 | Bories et al. | |
| 6,779,022 B1 | 8/2004 | Horstmann et al. | |
| 6,782,419 B2 | 8/2004 | Tobita et al. | |
| 6,784,899 B1 | 8/2004 | Barrus et al. | |
| 6,798,531 B1 | 9/2004 | Paz-Pujalt et al. | |
| 6,848,008 B1 | 1/2005 | Sevanto et al. | |
| 6,914,626 B2 | 7/2005 | Squibbs | |
| 6,987,744 B2 | 1/2006 | Harrington et al. | |
| 7,007,243 B2 | 2/2006 | Baldino | |
| 7,009,643 B2 | 3/2006 | Nakamura et al. | |
| 7,063,263 B2 | 6/2006 | Swartz et al. | |
| 7,248,285 B2 | 7/2007 | Needham | |
| 7,403,224 B2 * | 7/2008 | Fuller et al. | 348/231.3 |
| 2002/0101519 A1 | 8/2002 | Myers | |
| 2002/0191087 A1 * | 12/2002 | Hashimoto et al. | 348/231.3 |
| 2003/0036969 A1 | 2/2003 | Turgeman et al. | |
| 2003/0058353 A1 | 3/2003 | Tsue | |
| 2003/0081126 A1 | 5/2003 | Seaman et al. | |
| 2003/0184653 A1 | 10/2003 | Ohkubo | |
| 2004/0004663 A1 | 1/2004 | Kahn et al. | |
| 2004/0021780 A1 | 2/2004 | Kogan | |
| 2004/0047606 A1 * | 3/2004 | Mikawa | 386/95 |
| 2004/0114042 A1 | 6/2004 | Paolini et al. | |
| 2004/0126038 A1 | 7/2004 | Aublant et al. | |
| 2004/0153553 A1 | 8/2004 | Chotkowski et al. | |
| 2004/0157622 A1 | 8/2004 | Needham | |
| 2004/0183918 A1 | 9/2004 | Squilla et al. | |
| 2005/0104976 A1 * | 5/2005 | Currans | 348/231.5 |
| 2005/0134707 A1 | 6/2005 | Perotti et al. | |
| 2005/0254505 A1 | 11/2005 | Chang et al. | |
| 2005/0289111 A1 * | 12/2005 | Tribble et al. | 707/1 |

OTHER PUBLICATIONS

Naaman, M., et al., "Automatically Generating Metadata for Digital Photographs with Geographic Coordinates," WWW2004, May 17-20, 2004, New York, New York, USA, 2 pages.

Naaman, M., et al., "Automatic Organization for Digital Photographs with Geographic Coordinates," JCDL'04, Jun. 7-11, 2004, Tucson, Arizona, USA, 10 pages.

"Painting the Weather," [online] BBC, Oct. 17, 2005 [retrieved on Oct. 17, 2005] Retrieved from the Internet: <URL: http://www.bbc.co.uk/paintingtheweather/>, 1 page.

"NYC 2004 WWW Conference," [online] World Wide Web Conference, May 17, 2004 [retrieved on Oct. 17, 2005] Retrieved from the Internet: <URL: http://www2004.org/> 1 page.

Rawbrick.net Article, Photographs [online] Carol O., 2002-2005 [retrieved on Oct. 17, 2005] Retrieved from the Internet: <URL: http://www.rawbrick.net/article/?c=Photographs>, 7 pages.

JP00196933 (Atsushi) Jul. 14, 2000 (abstract) [online] Retrieved from the PAJ database.

Need a GPS and a Camera? Why not All-In-One? Publication Date Unknown (Copyright 2001-2004, Geospatial Experts, LLC) [online] Retrieved Oct. 5, 2004 [retrieved from the Internet] <URL: www.geospatialexperts.com/ricoh.html.>, pp. 1-2 and pp. 1-3.

* cited by examiner

AUTOMATIC GENERATION OF METADATA FOR A DIGITAL IMAGE BASED ON AMBIENT CONDITIONS

FIELD OF THE INVENTION

The present invention relates to digital imaging, and more particularly to a method and system for automatically generating metadata for a digital image based on ambient conditions.

BACKGROUND OF THE INVENTION

The importance of metadata for storage and retrieval of digital images is well recognized. Image metadata is essentially non-picture information that is embedded in the image in addition to the actual image data. The metadata is typically associated with a digital image either by the user or by the image capture device, e.g., a digital camera. The metadata manually provided by the user typically includes keywords, called tags, which may be used to categorize the image for subsequent searching. The metadata provided by image capture device typically includes information about the image, such as the time and date the picture was taken, by whom, with what equipment, and the like. Besides time and date, some image capture devices, such as camera phones, are also capable of automatically recording and storing location information, such as global positioning system (GPS) coordinates.

Although current digital imaging technology enables people to acquire images easily and to record additional information, retrieving the images based on metadata searches is not as easy. The challenge is not how to index the pictures using the metadata, but somehow relating a picture the user is trying to retrieve with some aspects of the user's memory about the picture. Time and location are useful as metadata, but their use to help a user search for images of interest is inherently limited. In many cases, users have a difficult time remembering the specific time or even interval of time when those pictures were taken, particularly for images taken years ago. Thus, using time to find those older pictures is often difficult.

Location may be easier to remember than image capture time, but in many cases, the user may not know the location of where a picture was taken, except within a large geographical region. For example, if a user takes a picture while driving through New Delhi, unless it is close to some famous landmark, the user might not be able to tell where exactly the picture was taken. Later, when the user tries to retrieve that picture, the user may not know what location or range of locations to use as the search terms.

In other cases, the user may have known the location where the picture was taken, but may not remember the details because the memory of the location may have faded in the user's mind. For example, if the user takes a long trip through a nature park, there may be few place names that the user can remember months later. As another example, after vacationing in a city for awhile, all the streets in the city may begin to look about the same to the user.

Searching for images using time and location may seem logical at first, but many users would find it more natural to search for information based on the feelings they had at the time the pictures were taken, or the feelings that the pictures remind them of. Although the user could attempt to solve this problem by entering his or her own metadata as captions that have meaning to them, unless the user remembers to search using exact keywords from those captions, it would still be difficult for the user to retrieve the pictures he or she desires. The metadata should be such that it accords with human memory, so that people can use the metadata to associate pictures with things they remember.

Mor Naaman et al. provide a method for "Automatically Generating Metadata for Digital Photographs with Geographic Coordinates" in which location information for digital photographs is used to automatically generate photo-related metadata that serves as additional memory cues and filters when browsing a collection of photos. For example, given the local time and location for each photo, information such as light status (day, dusk, night and dawn) and weather (rainy, clear, warm) is retrieved and used to generate metadata.

Metadata generated using generic weather data, however, may be too vague for the user to properly recall the information when searching for the following reasons. One reason is that symbolic adjectives for certain categories of weather, such as temperature and humidity (e.g., "hot" and "cold") is subjective to each person. For example, if someone were taking pictures in Louisiana, the definition of humid would shift toward very humid, while the definition of humid would shift down for someone in Arizona. Thus, using global weather labels for subjective criteria such as temperature and humidity may result in erroneous search results.

In addition, generic weather data tends to be regional and not sufficiently specific to the actual location of the picture. For instance, Naaman et al. generate weather metadata by translating an image's location (latitude, longitude) into a zip code and then uses the zip code and image date to query a weather web service to get weather information. The weather data returned for each day is an hourly report of the weather conditions (e.g., "rainy", "clear") and temperature. The temperature is computed as the average of temperatures measured in the hours around the photo time. The result of the query to the weather web service is then used for all photos taken in the same day and same area. The problem is that hourly weather reports of a particular zip code may not be indicative of the actual weather at the location and time of the image capture. For example, a picture of a couple kissing could have been taken just as it stopped raining and just as the sun was coming out (clearing), but the metadata for the picture generated from the weather reports may just say raining, which may not conform to what the couple may remember about the photo.

BRIEF SUMMARY OF THE INVENTION

The present invention provides a method and system for automatically generating metadata for a digital image based on ambient conditions. Aspects of the preferred embodiment include determining a plurality of ambient conditions associated with a location of a subject of a digital image captured with a mobile image capture device, the ambient conditions existing at a time related to a time of capture of the digital image; aggregating the plurality of ambient conditions into at least one ambient environment descriptor based on user-definable aggregation rules; and associating the ambient environment descriptor with the digital image as metadata.

According to the method and system disclosed herein, the generation of metadata based on environment descriptors of aggregations of ambient conditions and trends provides a natural memory cue for humans even years after an image is captured, thereby leading to improved retrieval of desired images.

DETAILED DESCRIPTION OF THE INVENTION

Figure 1:
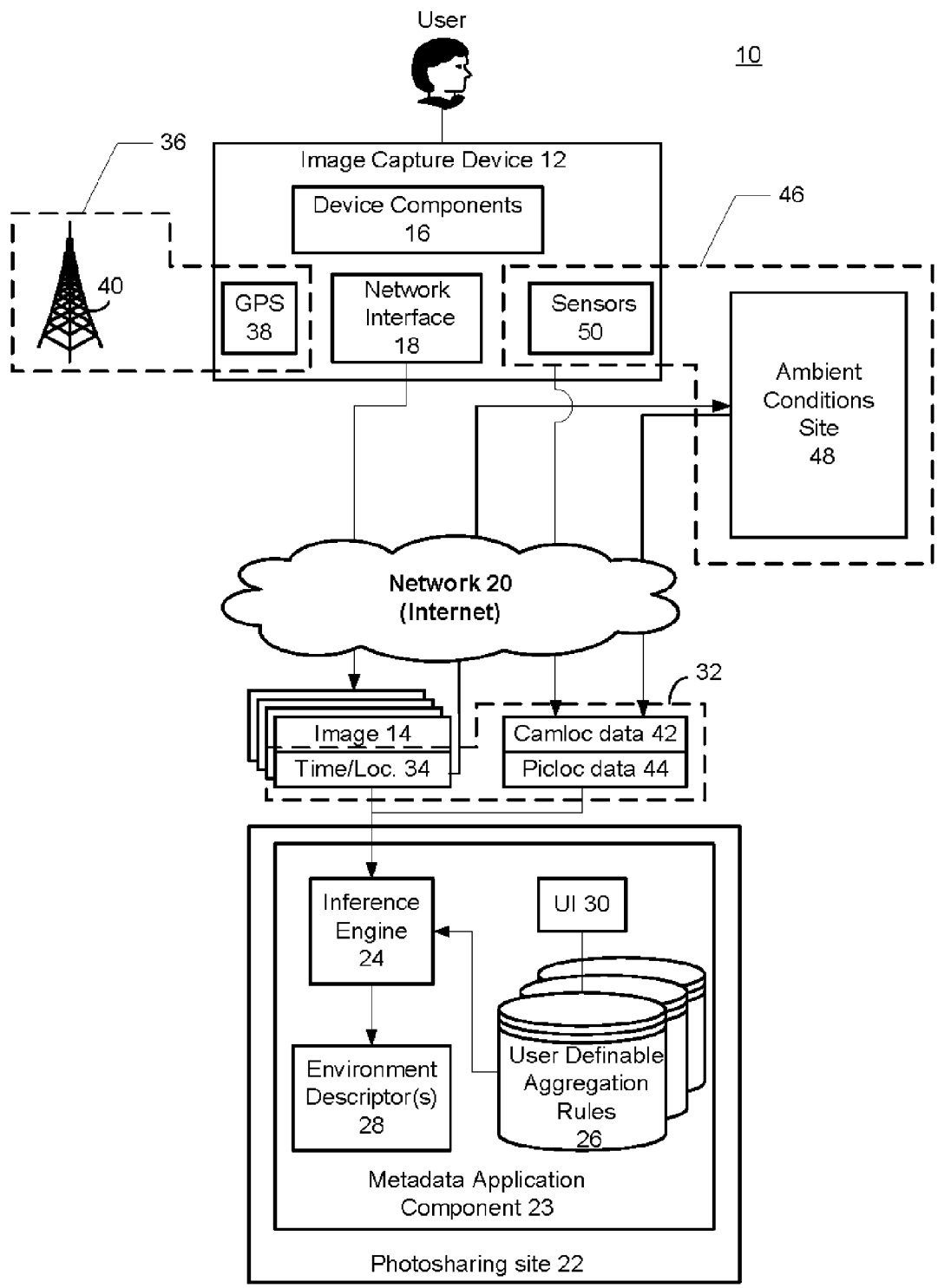
FIG. 1 is a block diagram of a system for generating metadata for a digital image based on ambient conditions in accordance with a preferred embodiment.

The present invention relates to a method and system for generating metadata for a digital image. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system is provided for generating metadata and to associate the metadata with a digital image for subsequent metadata-based searching. Data representative of the ambient conditions existing at a time related to a time of capture of the digital image, e.g., before, during, and after the image is collected automatically. As described above, however, simply recording the basic ambient conditions may not be adequate to capture some of the subtleties of what people can naturally remember about the prevalent weather conditions, as they perceive them. The sights and sounds at a time and place where a picture is taken, and the feelings evoked there are better captured through more sophisticated representations that are built on top of the ambient conditions.

The present invention provides a method and system for automatically generating metadata for a digital image based on ambient conditions existing at the time of the image capture that are analyzed and processed in a manner that emphasizes the dynamic nature of ambient conditions and the user's mobility and circumstances. The basic ambient conditions are used as raw data, which are then processed and summarized according to user-definable rules to produce higher-level metadata that is meaningful to users (especially to mobile users). In the preferred embodiment, both variations of ambient conditions occurring at various locations of the mobile image capture device and variations of the ambient conditions occurring at the fixed location of the subject of the image are recorded. The user-definable rules are used not only to tailor the definition of the adjectives describing subjective ambient conditions to individual users, but the user-definable rules are also used to define trends in the ambient conditions, define aggregations of the ambient conditions, and to define trends in the aggregation of ambient conditions based on the observed variations of the ambient conditions. Ambient environment descriptors are then applied to the image summarizing the set of ambient conditions and/or describing the observed trends. The ambient environment descriptor(s) may then be associated with the image metadata along with the original values of the ambient conditions. The user configurable rules are also used when a user enters ambient condition search terms to locate one or more images, such that the user's definitions are taken into account when searching the images.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

FIG. 1 is a block diagram of a system for generating metadata for the digital image based on ambient conditions in accordance with a preferred embodiment. The system 10 includes a mobile image capture device 12 for capturing digital images 14. The image capture device 12 includes device components 16 for carrying out the intended functions of the image capture device 12 (e.g., display, camera etc.), and may optionally include a network interface 18 for transmitting data, such as the images 14, over a network 20 (e.g., the Internet) via wired or wireless communication. Alternatively, the image capture device 12 may transmit data and images 14 over the network 20 through the use of a personal computer (not shown). Examples of the type of devices that may comprise the image capture device 12 include a camera-phone, personal digital assistant (PDA), digital camera, and laptop, for example.

The system 10 further includes a metadata application component 23 for automatically generating metadata for the images 14, which according to the preferred embodiment, is implemented and executed on a photosharing site 22 on the network 20. The photosharing site 22 hosts the images 14 received from the image capture device 12 for online sharing. The metadata application component 23, which includes an inference engine 24, user-definable aggregation rules 26, and a user interface 30, is configured for automatically generating metadata for the images 14. Automatic generation of metadata for the images 14 is accomplished through the use of the inference engine 24 that analyzes ambient conditions 32 associated with each image 14 according to the user-definable aggregation rules 26 in order to summarize the ambient conditions 32 into one or more ambient environment descriptors 28, as described below. The metadata application component 23 can be implemented in software, executable on a suitable general or special purpose processor, hardware, or using a combination of software and hardware components. Although in a preferred embodiment the metadata application component 23 for generating metadata is implemented within a photosharing site 22, in alternative embodiments, the metadata application component 23 may be loaded and run in a user's computer or within the image capture device 12 itself.

Figure 2:
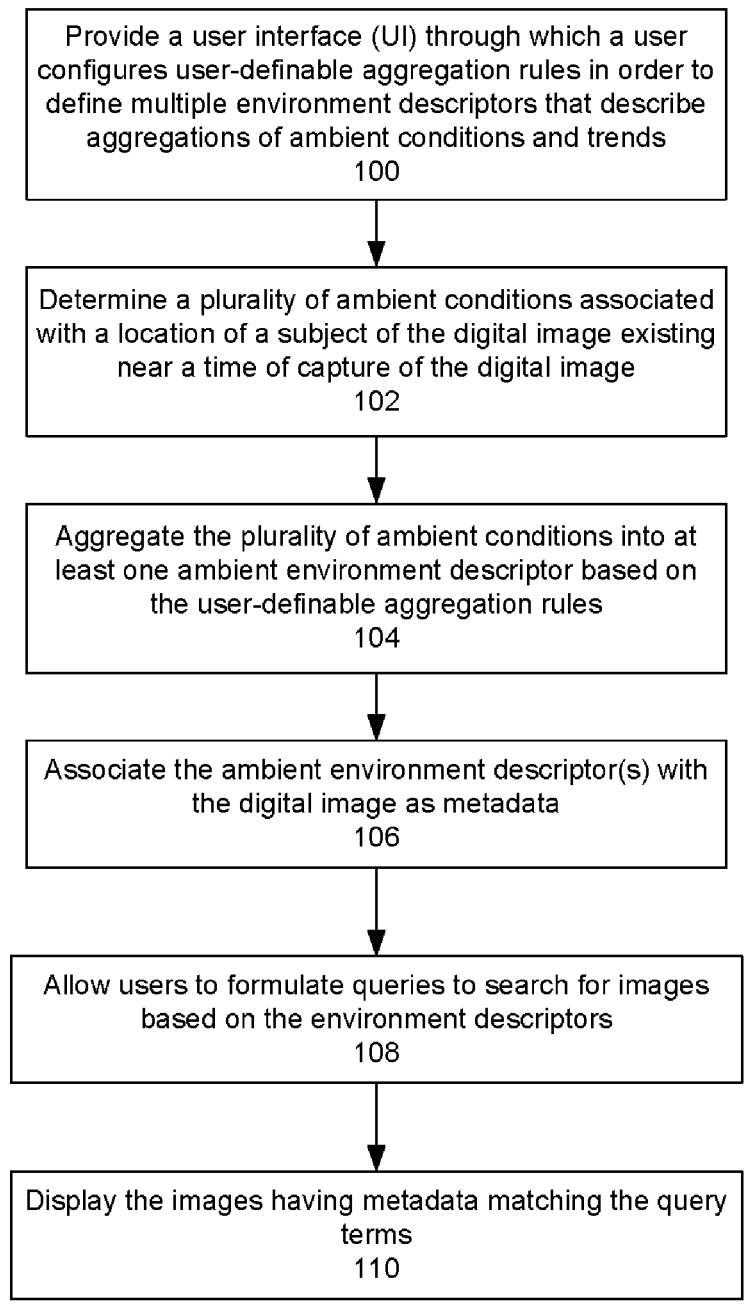
FIG. 2 is a flow diagram illustrating a process for automatically generating metadata for a digital image in accordance with a preferred embodiment.

FIG. 2 is a flow diagram illustrating the process for automatically generating metadata for the digital image in accordance with a preferred embodiment. Referring to both FIGS. 1 and 2, the process begins in step 100 by providing the metadata application component 23 with a user interface (UI) 30 through which a user may configure the user-definable aggregation rules 26 in order to define multiple ambient environment descriptors 28 that describe ambient conditions, trends of ambient conditions, and aggregations of ambient conditions and trends. The aggregation rules 26 configured by each user may be stored as a set of preferences under the user's account. In a preferred embodiment, the UI 30 for configuring the user-definable aggregation rules 26 is based on forms.

Figure 3:
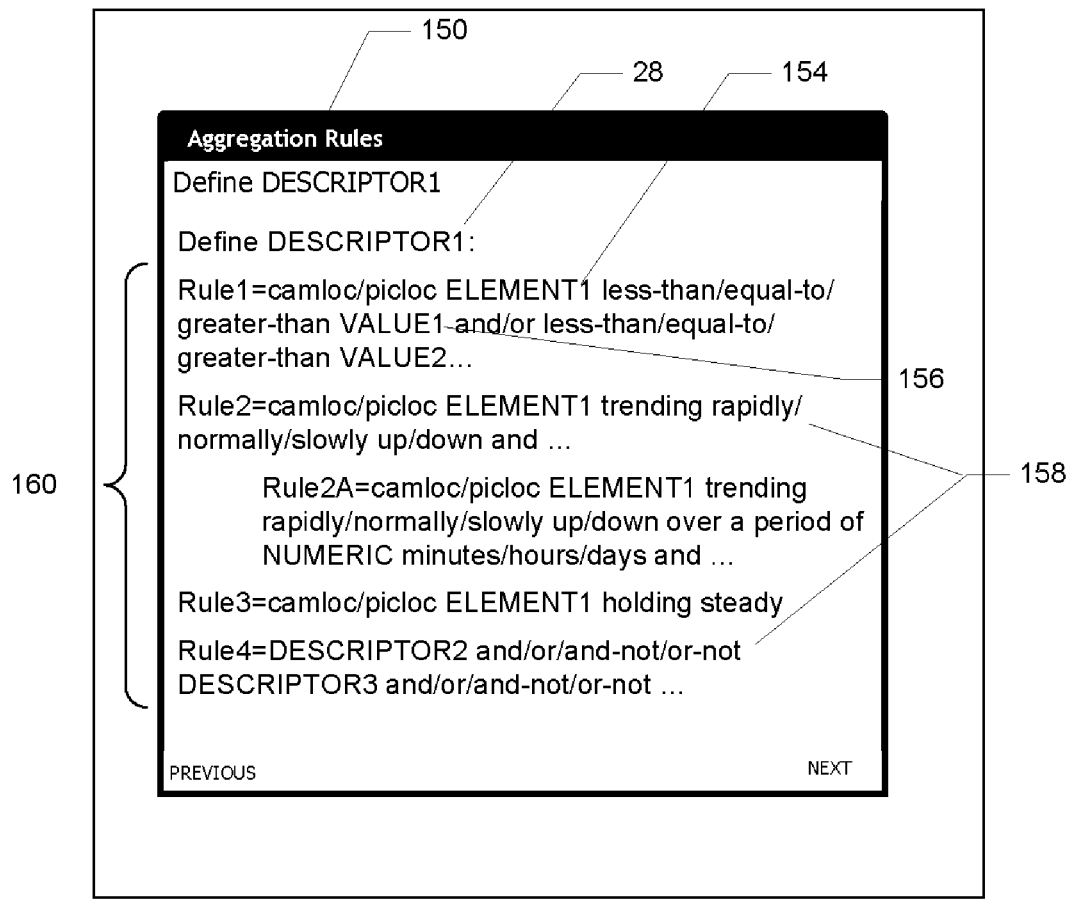
FIG. 3 is a diagram illustrating an exemplary user interface form interface displayed by the photosharing site configuring the user-definable aggregation rules.

FIG. 3 is a diagram illustrating an exemplary UI form interface displayed by the metadata application component 23. The form 150 is preferably displayed in a browser window and may include drop down list (not shown) that allows a user to select ambient environment descriptors 28 and to define each ambient environment descriptor 28 by creating one or more rules 160. Each rule 160 is created by selecting different combinations of ambient conditions existing at the camera location and/or the location of the subject of the image 14, which are shown as "CAMLOC/PICLOC elements" 154, ambient condition values 156, and various types operators 158, as shown. By selecting different combinations of CAMLOC/PICLOC elements 154, values 156, and operators 158, the user can create subjective definitions for ambient environment descriptors 28 that describe ambient conditions and their trends and aggregations.

Accordingly, the aggregation rules 150 preferably include rules defining value descriptors, trend descriptors, combination value descriptors and combination trend descriptors. A value descriptor is an ambient environment descriptor 28 summarizing the values of a particular type of ambient condition. For example, for the ambient condition "temperature", a value descriptor of "Warm" could be defined as an ambient environment descriptor 28 summarizing the range of values of 70° through 76°. Similarly, a trend descriptor is an ambient environment descriptor 26 summarizing changes observed in a series of values for a particular type of ambient condition (e.g., falling, rising, steady, or decreasing, increasing, etc).

A combination value descriptor summarizes the combination of value descriptors applied to related types of ambient conditions. For example, temperature and humidity are two types of ambient conditions that are related. The user could define a combination value descriptor "Muggy" when the values for temperature and humidity are observed as being "Hot" and "Humid." Similarly, a combination trend descriptor summarizes the trend descriptors applied to related ambient conditions. For example, the aggregation rules 26 may define "Sudden shower" as a combination of "Hot", "Humid", "Decreasing temp", and "Rainy".

The user-specific subjective ambient environment descriptors 28 of ambient conditions and their trends and aggregations help make the proposed approach useful for retrieving images 24 in a way that is natural to users. The user-definable aggregation rules 26 can be created on various bases. In a preferred embodiment, the aggregation rules 26 are definable by individual users. In an alternative embodiment, the aggregation rules 26 may be defined based on different demographic groups. The demographic groups may be defined culturally, geographically, or by interest, for example.

An example of defining the aggregation rules 26 based demographic groups might be aggregation rules 26 specific to a desert region, the people of which might conceptualize and experience humidity differently than people from a wet region. For example, the definition of pleasant weather "suhavna" in summer in India involves overcast skies, especially in the afternoon, whereas northern Europeans associate pleasant weather with bright and sunny days.

Another example of defining the aggregation rules 26 based on demographic groups is defining aggregation rules that are specific to an affinity group, such as the readers of some poems or novels. Fans of the English Romantic poet Wordsworth might consider defining ambient environment descriptors 28 based on Wordsworth's many imageries of nature. One example is his poem *Written in March:*

Like an army defeated
The snow hath retreated,
And now doth fare ill
On the top of the bare hill;
The plowboy is whooping-anon-anon:
There's joy in the mountains;
There's life in the fountains;
Small clouds are sailing,
Blue sky prevailing;
The rain is over and gone!

Using the user-defined aggregation rules 26 of the preferred embodiment, a fan of Wordsworth could create a completely new ambient environment descriptor 28 based on this poem as follows:

a. [Current time] Wind speed: gentle breeze AND
b. [Current time] Skies: partly cloudy AND
c. [Current time] Rain: none AND
d. [Last week] Rain: yes Users accessing the photosharing site 22 could then search for images that describe March weather as described by Wordsworth: the snow level is rapidly decreasing, the rain has stopped, and visibility is partly cloudy and clearing. It might be interesting to enthusiasts to look for pictures from other regions of the world that satisfy the same criteria, e.g., snowed some weeks previously, melted snow [except at higher elevations], rain a few days ago, no rain now, partly cloudy skies, light breeze.

In addition, the aggregation rules 26 may be configured for different demographic groups by combining the aggregation rules from the users comprising the respective demographic groups. For example, sets of aggregation rules 26 may be configured for different regions of the United States, such as Northeast, Southeast, Midwest, South, Mountain, Northwest, and Southwest, by aggregating, combining, and/or averaging the aggregation rules 26 of the users located in those respective regions.

Referring again to FIG. 2, in step 102, once the aggregation rules 26 have been provided, a plurality of ambient conditions 32 associated with a location of a subject of the digital image 14 existing at a time related to a time of capture of the digital image 14 are determined. The ambient conditions 26 may include weather and non-weather related conditions. Examples of weather conditions include, but are not limited to, temperature, humidity, barometric pressure, visibility, season, and wind. Examples of non-weather conditions include, but are not limited to, time, location, heading, elevation, and brightness level. The weather and non-weather related conditions may correspond to the subject of the image 14, the image capture device 12, or both.

Referring to FIG. 1, in one embodiment, time and location data 34 may be included with each of the images 14 as image metadata when the images 14 are uploaded to the photosharing site 22. The time and location data 34 may be determined by a location-determining means 36 that is capable of determining and recording the changing location of the image capture device 12 over time. In a preferred embodiment, the location-determining means 36 comprises a GPS component 38 within the image capture device 12. In an alternative embodiment, the location-determining means 36 comprises a network triangulation component 40 (e.g., using cell tower triangulation), a detailed description of which is outside the scope of this description.

As described above, however, simply recording the basic ambient conditions has drawbacks and may be insufficient as memory aids to help the user search for images 14. According to one aspect of the preferred embodiment, the dynamic nature of ambient conditions and the user's mobility and circumstances are taken into account during the process of automatically generating metadata by processing and analyzing two main varieties of dynamism:

1) variations of ambient conditions over time at the fixed location of the subject of the digital image, referred to here as picture location (PICLOC) data 42; and
2) variations of ambient conditions over time at the location of the image capture device 12, referred to here as camera location (CAMLOC) data 44.

The metadata application component 23 preferably receives PICLOC data 42 and the CAMLOC data 44 as a series of ambient conditions readings within a specified period of time related to a time of the image capture 12, which may include for a set period of time before the time of image capture, at the time of image capture, and after the time of image capture. These sets of basic ambient conditions are treated as raw data, which are then processed and summarized by the inference engine 24 and user-definable aggregation rules 26 to produce higher-level metadata, the ambient environment descriptors 28, that describe ambient condition aggregations and trends.

As an example of producing high-level metadata based on changes in ambient conditions over time at the picture location and at the camera location, consider the following scenario. A user takes a picture in bright conditions, but it may matter a lot to the user to know that it just stopped raining. People remember such changes in ambience better, and these changes produce a distinctive feeling, in this example, because maybe the sky is brighter and the air is clearer than in other circumstances, and there is the smell of wet earth. In this example, the variations in ambient conditions at the location where a given picture is taken are recorded, even though the camera was not at that location the whole time. For example, according to the present embodiment, if it just stopped raining by the Tower of Pisa moments before the user got there and took the picture, the time and date of the picture is used to retrieve these changes in conditions, and these variations of conditions are aggregated into higher-level descriptors that convey this notion.

An example of ambient conditions that vary over time at the location of the camera is when the camera moves from a cloudy to a bright or from a bright to a cloudy region. The user's feeling about the picture in this example may be quite different than if he or she had only a static set of ambient conditions to describe the picture.

The CAMLOC data 42 and the PICLOC data 44 may be determined by ambient condition determining means 46. The ambient condition determining means 46 may comprise the following:

1) an ambient conditions site 48 on the network 20 that provides the PICLOC data 44 to the metadata application component 23 based on the specified time and location 34,
2) sensors 38 on the image capture device 12 for sensing ambient condition values in real-time and for storing the ambient condition values as the CAMLOC data 42, or
3) a combination of both 1) and 2).

The PICLOC data 44 is retrieved by querying the ambient conditions site 48 with a specified time and location 34 of the image 14. In a preferred embodiment, the ambient conditions site 48 returns values for each type of ambient condition, rather than an adjective describing the values. That is, rather than returning ambient condition adjectives such as "hot, mild, or cold" as the temperature, the ambient conditions site 48 preferably returns the actual temperature values, e.g., 73°, 74°, 76°, over the specified time period.

The CAMLOC data 42 is provided if the image capture device 12 includes sensors 50 for sensing ambient condition values in real-time and recording the values as image metadata. A suitably equipped image capture device 12 can capture more specific kinds of ambient conditions. For example, if the image capture device 12 is equipped appropriately, the image capture device 12 can associate the captured image 14 with the local temperature or atmospheric pressure or humidity as well as brightness at the time the picture is taken. Because the image capture device 12 is typically located near where the picture is being taken, the image capture device 12 can provide the most accurate and valuable information-generally, better than such information from a remote website. The CAMLOC data can, however, be approximated by retrieving information from a remote external service. As such, the data can correspond to where and when the specified image is captured.

In an exemplary embodiment, examples of the sensors 50 that the image capture device 12 may be equipped with include a light meter, a thermometer for measuring temperature, a barometer for measuring humidity, an altimeter for measuring elevation, and a digital compass for measuring heading. Most image capture devices 12 are already equipped with a light meter to measure light intensity. However, the current approach is to record the brightness both prior to the flash and during the flash (when appropriate) to determine how bright it was in general and how bright it was during the image capture. The combination of the brightness in the location where the image 14 is captured and the general conditions is important. For example, if a person captures the image 14 while inside a cathedral, the detected brightness at the camera location might be quite dark even though it is midday and the brightness at the picture location is quite bright.

Data recorded by the digital compass and the altimeter are examples of non-weather elements that may be useful for invoking the user's memory (e.g., recording "North" as the direction of travel as the user travels from Italy to Switzerland and elevation changes "going uphill"). Heading and elevation changes can be specified over larger or shorter intervals to capture general or particular trends. For example, a trek north may involve some small turns in other directions.

For some images 14, the location of the image capture device 12 and the subject of the image may be the same position (within a distance threshold). Assuming the image capture device 12 has remained at that location for a sufficient period of time, the CAMLOC data 42 and the PICLOC data 44 would be the same and only one set of data is necessary. However, in cases where the image capture device 12 is moving prior to or after image capture, then the CAMLOC data 42 would include values for ambient conditions where the camera had been during the specified time frames before, during and after image capture. In cases where the subject of the image 14 is far away, such as a picture of a distant mountain peak or landmark, then the CAMLOC data 42 and the PICLOC data 44 might be different and the PICLOC data 44 could be determined by using the camera location to determine zip code and then use the zip code to query the ambient condition site 48 to obtain the conditions in the general area of the subject. Alternatively, for subjects whose GPS location or address is known, the ambient conditions site 48 could be queried with this information directly.

Whether there is a benefit from including sensors 50 on the image capture device 12 depends on the nature of the queries that will be formulated. For some applications, it might be adequate to record only the camera's changing position over time in order to obtain the PICLOC data 44 from the ambient conditions site 48. When the location of the image capture device 12 is changing quickly (e.g., when the user is traveling on a motorcycle, car, train, plane, or even a bicycle) and the queries involve medium or long intervals (say an hour), then the ambient conditions site 48 contacted with position and time would be able to provide the necessary CAMLOC data 42. For example, if the user travels from one town to the next or through a geographical structure such as a valley, this would be reasonable. When the location of the image capture device 12 is changing slowly (e.g., when the user is traveling on foot) and the queries involve brief intervals (say five minutes), then broad coverage by the ambient conditions site 48 may not be adequate. The ambient conditions site 48 would need to provide ambient data with fine granularity or sensors would be required on the image capture device 12 to capture the necessary ambient conditions.

Referring to FIG. 2, after the plurality of ambient conditions 32 is determined, in step 104 the inference engine 24 aggregates the ambient conditions 32 into at least one ambient environment descriptor 28 based on the user-definable aggregation rules 26. As described above, if the image capture device 12 includes sensors 50, then the metadata application component 23 receives the CAMLOC data 42 along with other image metadata, including the time and location 34. The time and location 34 may then be used to retrieve the PICLOC data 44 from the ambient conditions site 48.

In one embodiment, the PICLOC data 44 is retrieved when the image 14 is received by the metadata application component 23 and added to an image library or web album. In a second embodiment, the PICLOC data 44 is retrieved sometime after it is received and stored, such as during a batch metadata generation process. In this embodiment, the PICLOC data 44 can be retrieved during generation of the metadata, rather than in real-time. In a third embodiment, the image capture device 12 may use the time and location 34 to retrieve the PICLOC data 44 from the ambient conditions site 48, and then pass the PICLOC data 44 with the image to the metadata application component 23.

In step 106, the metadata application component 23 associates the ambient environment descriptor(s) 28 with the digital image 14 as metadata. The user ID of the user is used to retrieve the aggregation rules 26 created by the user/image owner. The reasoning engine 24 then applies the aggregation rules 26 to the CAMLOC data 42 and/or the PICLOC data 44 associated with the image 14 and stores the output environment descriptors 28 as image metadata that describe the ambient conditions and trends for the image 14.

In step 108, users are allowed to formulate queries via the metadata application component 23 to search for images 14 based on the dynamic ambient environment descriptors 28. In step 110, the metadata application component 23 produces any images 14 having metadata that matches the query terms.

To enable query processing, the images 14 may be indexed according to their environment descriptors 28, CAMLOC data 42, and PICLOC data 44. In a preferred embodiment, only the ambient condition values for a short period before and after the time of image capture need be stored for a given image 14. For example, if a user took pictures in Rome only in the month of June, 2004, the metadata application component 23 need not store ambient condition data for Rome in the month of July, 2004. In a preferred embodiment, only the ambient condition data that occurred a few minutes or hours before and after a given image 14 is captured need be stored.

Using the UI 30, the user may formulate sophisticated queries by describing variations in ambient conditions, and aggregations of ambient conditions and trends. Queries may be formulated and stored by end-users or the metadata application component 23 can create and display query templates through the UI 30 allowing users of the site to execute those queries. In a preferred embodiment, the user formulates queries based on PICLOC data 44 and CAMLOC data 42 elements.

Assuming the user posing the query has configured the user-definable aggregation rules 26, then the symbolic descriptions of the PICLOC data 44 and CAMLOC data 42 elements (and their variations and combinations) are analyzed based on the definitions provided in the user's aggregation rules 26. For example, the user can specify a certain kind of weather as "hot" or "cold"—presumably different for a typical Egyptian than for a typical Norwegian. This results in a name associated with the known ambient condition elements. Later images 14 can be mapped through well-known techniques like "nearest neighbor" to associate images 14 (based on its ambient condition elements and changes to them) with the specified symbolic term. In an alternative embodiment, the above descriptions can be tuned for different sets of images 14 automatically by considering each given set of images 14 separately or biasing the image 14 based on the climate where they were taken.

The query can be formulated in any one of the following ways. The user can specify the desired PICLOC data 44 and CAMLOC data 42 elements numerically (e.g., 83°). The user can specify the desired ambient condition elements using symbolic descriptions (e.g., "hot"). The user can specify variations (over time or over time and space) in the desired PICLOC data 44 and CAMLOC data 42 elements using symbolic descriptions. The user can specify correlated sets of the desired PICLOC data 44 and CAMLOC data 42 elements using symbolic descriptions.

The following is an example query based on variations in the PICLOC data 44: "Find pictures taken in Rome last summer when it was warm and dry but before it got hot and humid that afternoon." The following is an example query based on variations in the CAMLOC data 42: "Find pictures taken when I came out of the fog, while driving in the vicinity of Berkeley, Calif., last winter."

In summary, the queries can be thought of as being formulated in terms of patterns of variation based on the underlying ambient conditions. During query execution, the inference engine 24 evaluates a given pattern in terms of the ambient condition data 32 that was previously recorded or summarized.

The approach provided by the preferred embodiment presents several advantages. The approach of the preferred embodiment automatically creates metadata: there is little or no overhead on the user and thus usability is high. Another advantage is that the generation of metadata based on environment descriptors of aggregations of ambient conditions and trends is natural for humans and works as a great memory cue even years after an image is captured. This leads to improved retrieval of desired images. The more the enhancement of users' memory can be enabled and metadata that evokes their memories, the better for the precision as well as the quality of the experience. Aggregations of ambient conditions and trends are useful even for pictures that are taken indoors because, even when indoors, people often (if not always) remember the ambient conditions that existed outside. In other words, aggregations of ambient conditions and trends provide another set of dimensions by which users can search for information—fortunately, dimensions that human beings possibly have an innate ability to recognize and associate with their emotions.

Figure 4:
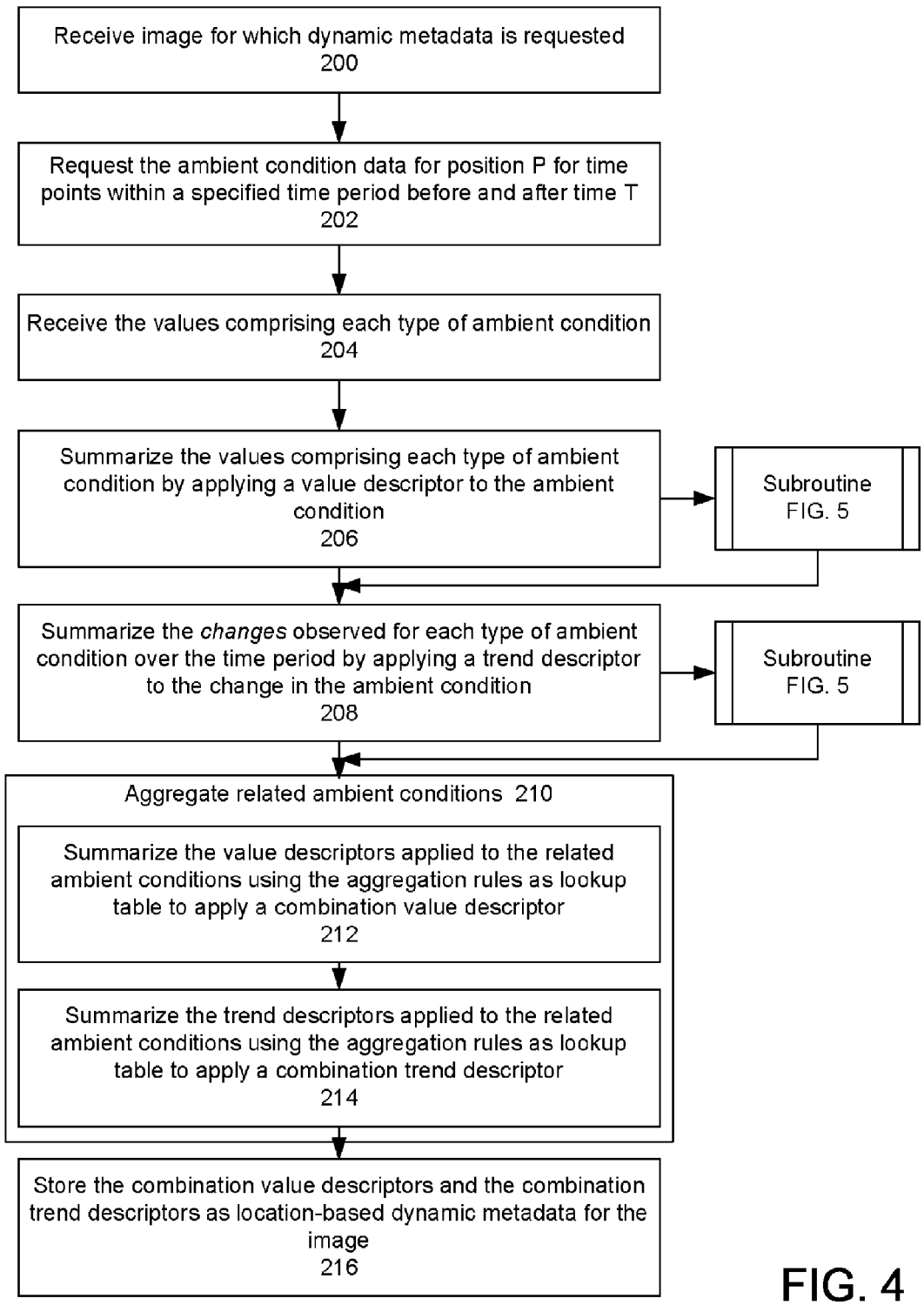
FIGS. 4-6 are flow diagrams illustrating exemplary embodiments for the process of aggregating a plurality of ambient conditions into one or more ambient environment descriptors.
Figure 5:
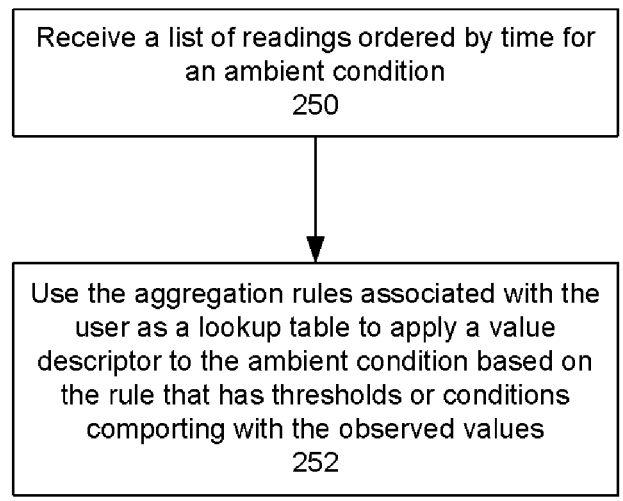
Figure 6:
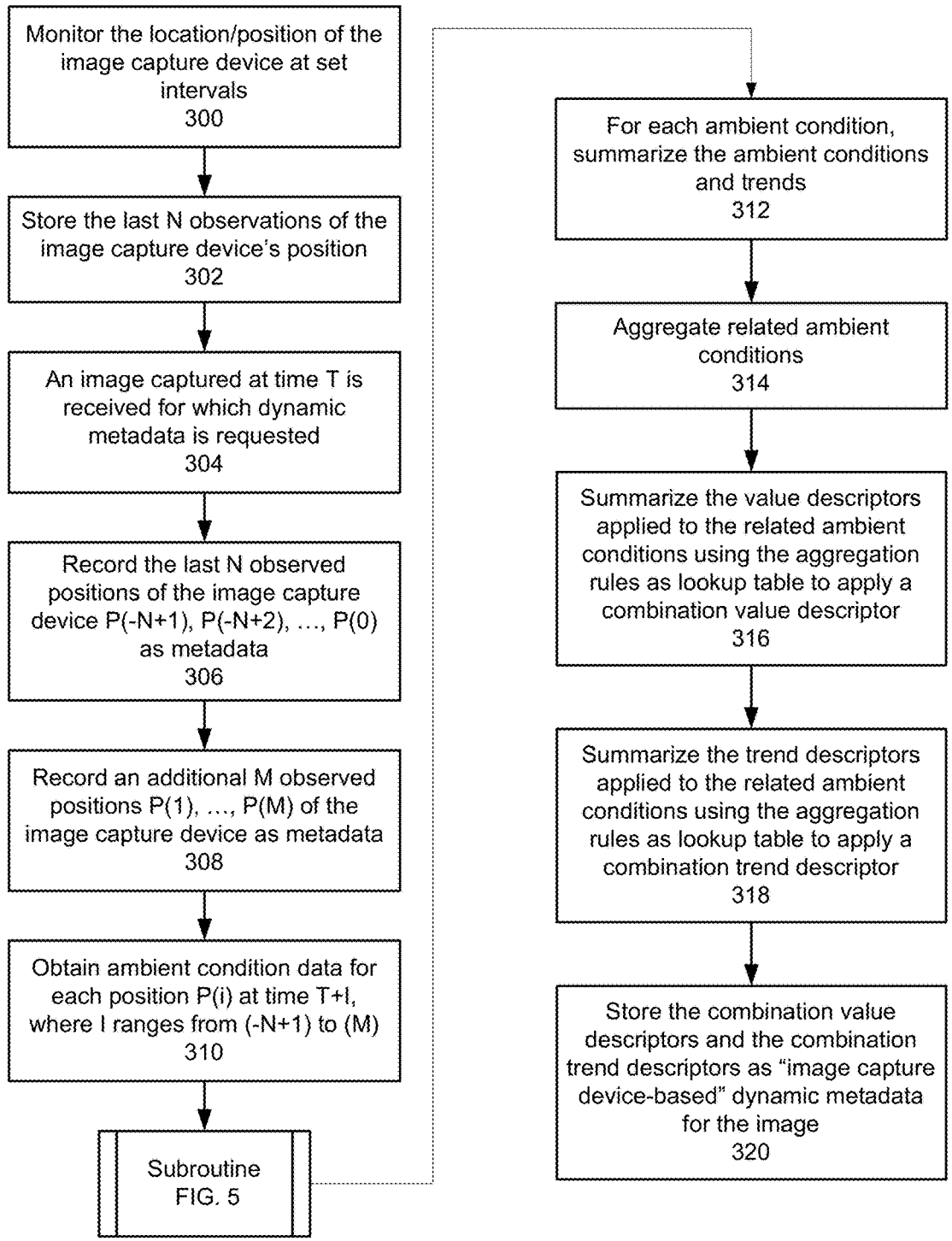

FIGS. 4-6 are flow diagrams illustrating in further detail the process performed by the inference engine 24 for aggregating a plurality of ambient conditions into one or more ambient environment descriptors 28 corresponding to step 104 in FIG. 2.

FIG. 4 is flow diagram of the process for aggregating the PICLOC data 44, which embody variations in ambient conditions at a fixed location in accordance with a preferred embodiment. The process begins in step 200 in which an image 14 is received for which metadata is requested that has an image capture time T and a location/position of P. The request may be explicitly initiated by the user, or by a metadata service that the user subscribes to, perhaps provided by the photosharing site 22.

In step 202, the ambient condition data for position P for time points within a specified time period before and after time T is requested. As an example, the time period is in minutes (e.g., T−30 minutes, or T+15 minutes), but other time periods might be equally desirable.

In step 204, the values comprising each type of ambient condition (temperature, humidity, and so on) are received. In step 206, the values comprising each type of ambient condition are summarized over the above time period by applying a value descriptor to the ambient condition, preferably using the subroutine described in FIG. 5.

FIG. 5 is a flow diagram of a subroutine that may be used to summarize an ambient condition or a change in an ambient condition. The process begins is step 250 by receiving a list of readings ordered by time for an ambient condition. In step 252, the aggregation rules 26 associated with the user are used as a lookup table to apply a value descriptor to the ambient condition based on the rule 160 that has thresholds or conditions comporting with the observed values. For example, if the observed readings for temperature were 70° through 76°, and a rule defines "Warm" as an average temperature of 73°, then temperature is assigned the value descriptor of "Warm".

Referring again to FIG. 4, after each of the ambient conditions are summarized, then in step 208, the changes observed for each type of ambient condition are summarized over the time period by applying a trend descriptor to the change in the ambient condition, preferably using the subroutine described in FIG. 5. In this case, however, the subroutine will apply a trend descriptor, rather than a value descriptor. Trend descriptors for temperature may include rapidly decreasing, decreasing, steady, increasing, and rapidly increasing, for instance. These same trend descriptors may be applied to other ambient conditions, such as brightness and humidity as well.

In step 210, related ambient conditions are aggregated by performing step 212 and 214. In step 212, the value descriptors applied to the related ambient conditions are summarized using the aggregation rules 26 as a lookup table to apply a combination value descriptor. The following are example rules for combining related ambient conditions, showing how two or more conditions can be combined.
1. muggy=warm and very humid
2. sweltering=hot and humid
3. balmy=mild, breezy, and partially humid
4. driving rain=rain and windy
5. monsoon-like=warm and gusty and rainy and winds-from-South-South-West In step 214, the trend descriptors applied to the related ambient conditions are summarized using the aggregation rules 26 as a lookup table to apply a combination trend descriptor. Examples of trend descriptor rules indicating summarizations of changes in an ambient condition include:
Sudden shower=hot and humid transitioning to cooler and rainy, and
Clearing=foggy, cold, and partly humid transitioning to brightening, warming, and with falling humidity.

The following are additional example rules indicating summarizations of changes in an ambient condition. Here DELTA refers to the change in value or trend of the given ambient condition element. Square brackets are used to refer to a time point relative to the present time point, which is assumed to be T. Here the base time unit is 1 minute, but could alternatively be 5 minutes or another suitable time period.
Darkening from=[T] DELTA(brightness)=decreasing.
Just-darkened=[T−1] DELTA(brightness)=decreasing and brightness=low.
Sudden cloud=DELTA(brightness)=decreasing and brightness=medium and (humidity=medium or humidity=high).

In step 216, the combination value descriptors and the combination trend descriptors (singly and aggregated, as available) are stored as location-based metadata for the image 14. Unless there are space constraints, it can be simplest to store both the basic and the derived summary data for convenience, meaning that the value descriptors and the trend descriptors for each of the ambient conditions may also be stored. Under space constraints, the basic data may be discarded and only the summary data stored.

FIG. 6 is flow diagram of the process for aggregating the CAMLOC data 44, which embody variations in ambient conditions at a location of the image capture device over time. The process begins in step 300 in which the location/position of the image capture device 12 is monitored at set intervals, such as every five minutes, for instance. In step 302, a rolling set of the last N observations of the image capture device's position are stored. As an example, the last 10 positions may be retained.

In step 304, an image 14 capture at time T is received for which metadata is requested. In step 306, the last N observed positions (including the current position) of the image capture device 12 P(−N+1), P(−N+2), . . . , P(0) are recorded as metadata, where P(0) corresponds to the current position, i.e., where the image is captured. In step 308, an additional M observed positions P(1), . . . , P(M) of the image capture device 12 are recorded as metadata. As an example, the last 9 positions and the next 5 may be recorded in addition to the current position. That is, N=10 and M=5.

In step 310, ambient condition data 32 is obtained for each position P(i) at time T+I, where I ranges from (−N+1) to (M). If the capture device 12 includes sensors 50, then the ambient condition data 32 may be obtained from the image capture device 12. Otherwise, the ambient condition may be requested from the ambient condition site 48 by either the image capture device 12 or the metadata application component 23.

In step 312, for each ambient condition (brightness, humidity, and so on), the inference engine 24 summarizes the ambient conditions and trends using the subroutine shown in FIG. 5.

In step 314, related ambient conditions are aggregated by performing steps 316 and 318. In step 316, the value descriptors applied to the related ambient conditions are summarized using the aggregation rules 26 as a lookup table to apply a combination value descriptor. In step 318, the trend descriptors applied to the related ambient conditions are summarized using the aggregation rules 26 as lookup table to apply a combination trend descriptor.

In step 320, the combination value descriptors and the combination trend descriptors are stored (singly and aggregated, as available) as "camera-based" metadata for the image 14.

To further illustrate the preferred embodiment, consider the following examples of queries that could be posed based on descriptions of environment descriptors 28 using CAMLOC data 42 elements.

EXAMPLE 1

Search for Images Taken Soon Before the User Exited a Car or Taxi

Average speed close to picture event below 3 miles per hour, and
Peak speed in 5-10 minutes before picture event above 10 miles per hour.

EXAMPLE 2

Search for Images Taken by a Number of Users Visiting the Lake District in England On-walking-trip: Over an interval of x hours before and after this image: peak speed approximately 3 miles per hour.
On-bicycle-trip: Over an interval of x hours before and after this image: average speed peak speed approximates 8 miles per hour.
On wet ground but no rain: Over an area where there was rain the previous night.
On walking trip over wet ground: combine above definitions.

EXAMPLE 3

Search for Images Taken by a User and Others While on Train Trips Through the Alps or While Driving a Car in the San Francisco Bay Area Sudden fog (happens often when going from one valley to the next): For an interval of x minutes before this image there was no fog but for an interval of y minutes before this image there was a fog (where y<x).
Sudden clearing: reverse of above.

EXAMPLE 4

Search for Images Taken in the US Gulf Coast Before, During, and After Hurricane Katrina Before: when the barometric pressure was falling and wind speeds were increasing
In the eye: when the cloud cover had cleared and the barometric pressure had stopped falling.

A method and system for automatically generating metadata based on ambient conditions has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, , and is to be executed by a processor. Accordingly, many modifications may be made by one of ordinary skill in the art without departing from the spirit and scope of the appended claims.

What is claimed is:

1. A method for automatically generating metadata for a user for a digital image, comprising:
    obtaining user-definable aggregation rules of the user that includes at least one of:
        a rule indicating that "muggy" is specified when a plurality of ambient conditions is "warm" and "very humid";
        a rule indicating that "sweltering" is specified when the plurality of ambient conditions is "hot" and "humid";
        a rule indicating that "balmy" is specified when the plurality of ambient conditions is "mild", "breezy", and "partially humid";
        a rule indicating that "driving rain" is specified when the plurality of ambient conditions is "rainy" and "windy";
        a rule indicating that "monsoon-like" is specified when the plurality of ambient conditions is "warm" and "gusty" and "rainy" and "winds from the South to South-West";
        a rule indicating that "Sudden shower" is specified when the plurality of ambient conditions is "hot" and "humid" transitioninq to "cooler" and "rainy"; and
        a rule indicating that "Clearing" is specified when the plurality of ambient conditions is "foggy", "cold", and "partly humid" transitioninq to "brightening", "warming", and with "falling humidity";
    determining a plurality of ambient conditions existing at a time related to a time of capture of the digital image and associated with a location of a subject of the digital image captured with a mobile image capture device even when the mobile image capture device is in a different location, wherein determining the plurality of ambient conditions includes determining variations of the ambient conditions over time by receiving readings of the ambient conditions at a plurality of times including at least one of a time before the time of capture, at the time of capture, and after the time of capture;
    aggregating and transforming data associated with the plurality of ambient conditions into at least one ambient trend descriptor based on the obtained user- definable aggregation rules wherein the aggregating includes aggregating the variations of the ambient conditions determined over the plurality of times;
    associating the ambient trend descriptor with the digital image as metadata; and
    enabling a user to search for the digital image based on the at least one ambient trend descriptor.

2. The method of claim 1 wherein determining the plurality of ambient conditions at the location of the subject of the digital image further comprises receiving the ambient conditions from at least one of;
    an online information source, and
    from sensors of the image capture device.

3. A method for automatically generating metadata for a user for a digital image, comprising:
    obtaining user-definable aggregations rules of the user that includes at least one of:
        a rule indicating that "muggy" is specified when a plurality of ambient conditions is "warm" and "very humid";
        a rule indicating that "sweltering" is specified when the plurality of ambient conditions is "hot" and "humid";
        a rule indicating that "balmy" is specified when the plurality of ambient conditions is "mild", "breezy", and "partially humid";

a rule indicating that "driving rain" is specified when the plurality of ambient conditions is "rainy" and "windy";

a rule indicating that "monsoon-like" is specified when the plurality of ambient conditions is "warm" and "gusty" and "rainy" and "winds from the South to South-West";

a rule indicating that "Sudden shower" is specified when the plurality of ambient conditions is "hot" and "humid" transitioning to "cooler" and "rainy"; and a rule indicating that "Clearing" is specified when the plurality of ambient conditions is "foggy", "cold", and "partly humid" transitioning to "brightening", "warming", and with "falling humidity";

determining a plurality of ambient conditions existing at a time related to a time of capture of the digital image and associated with a location of a subject of the digital image captured with a mobile image capture device even when the mobile image capture device is in a different location, wherein determining the plurality of ambient conditions includes determining variations of the ambient conditions over time by receiving readings of the ambient conditions for at least one of a fixed location of the subject of the digital image and a location of the image capture device at a plurality of times including at least one of a time before the time of capture, at the time of capture, and after the time of capture;

aggregating and transforming data associated with the plurality of ambient conditions into at least one ambient environment descriptor based on the obtained user-definable aggregation rules wherein the aggregating includes aggregating the variations of the ambient conditions determined over the plurality of times;

associating the ambient environment descriptor with the digital image as metadata; and enabling a user to search for the digital image based on the at least one ambient environment descriptor.

4. The method of claim 3 wherein the ambient conditions include weather-related ambient conditions and non-weather related ambient conditions.

5. The method of claim 4 wherein the weather-related ambient conditions include any combination of temperature, humidity, barometric pressure, visibility, season, and wind.

6. The method of claim 4 wherein the non-weather related ambient conditions include any combination of at least one of location, heading, elevation, and brightness level of at least one of the subject and the image capture device.

7. The method of claim 1 further including providing a user interface through which the aggregation rules are configured to define the at least one ambient environment descriptor.

8. The method of claim 7 wherein the aggregation rules are configured for each individual end-user, thereby allowing subjective ambient environment descriptors to be defined.

9. The method of claim 7 wherein the aggregation rules are configured for different demographic groups.

10. The method of claim 3 wherein aggregating the plurality of ambient conditions into an ambient environment descriptor further comprises, receiving values for each of the ambient conditions within a specified time period before and after the time of capture; and for each of the ambient conditions, summarizing the values of the ambient condition by applying an value descriptor to the ambient condition; and summarizing changes in the values of the ambient condition by applying a trend descriptor to the ambient condition.

11. A method for automatically generating metadata for a digital image, comprising:

determining a plurality of ambient conditions associated with a location of a subject of the digital image captured with a mobile image capture device even when the mobile image capture device is in a different location, the ambient conditions existing at a time related to a time of capture of the digital image;

aggregating the plurality of ambient conditions and transforming data associated with the plurality of ambient conditions into at least one ambient environment descriptor based on user-definable aggregation rules wherein aggregating the plurality of ambient conditions into an ambient environment descriptor further comprises receiving values for each of the ambient conditions within a specified time period before and after the time of capture, for each of the ambient conditions, summarizing the values of the ambient condition by applying an value descriptor to the ambient condition, and summarizing changes in the values of the ambient condition by applying a trend descriptor to the ambient condition, aggregating related ones of the ambient conditions by, summarizing the value descriptors applied to the related ambient conditions using the user-definable rules as a lookup table to apply a combination value descriptor and summarizing the trend descriptors applied to the related ambient conditions using the user-definable rules as a lookup table to apply a combination trend descriptor; and associating the ambient environment descriptor with the digital image as metadata.

12. The method of claim 11 wherein aggregating the plurality of ambient conditions into an ambient environment descriptor further comprises storing the combination value descriptors and the combination trend descriptors as the image metadata.

13. The method of claim 12 wherein aggregating the plurality of ambient conditions into an ambient environment descriptor further comprises storing the value descriptors and the trend descriptors for each of the ambient conditions as the image metadata.

14. The method of claim 12 wherein determining the plurality of ambient conditions further comprises determining variations of the ambient conditions over time for both a fixed location of the subject of the digital image, and a location of the image capture device.

15. The method of claim 1 wherein enabling a user to search for the digital image based on the ambient environment descriptor includes allowing searches to be performed for the digital image by specifying desired metadata including the at least one ambient environment descriptor.

16. The method of claim 15 further comprising allowing searches to be performed for the digital image by specifying variations of the ambient conditions over time for both a fixed location of the subject of the digital image, and a location of the image capture device.

17. A system for automatically generating metadata for a user for a digital image, comprising:

a mobile image capture device for capturing the digital image;

means for determining a plurality of ambient conditions existing at a time related to a time of capture of the digital image and associated with a location of a subject of the digital image device even when the digital image device is in a different location;

a metadata application component for:
automatically generating the metadata for the digital images by obtaining user-definable aggregation rules of the user that includes at least one of:
a rule indicating that "muggy" is specified when the plurality of ambient conditions is "warm" and "very humid";
a rule indicating that "sweltering" is specified when the plurality of ambient conditions is "hot" and "humid";
a rule indicating that "balmy" is specified when the plurality of ambient conditions is "mild", "breezy", and "partially humid";
a rule indicating that "driving rain" is specified when the plurality of ambient conditions is "rainy" and "windy";
a rule indicating that "monsoon-like" is specified when the plurality of ambient conditions is "warm" and "gusty" and "rainy" and "winds from the South to South-West";
a rule indicating that "Sudden shower" is specified when the plurality of ambient conditions is "hot" and "humid" transitioning to "cooler" and "rainy"; and
a rule indicating that "Clearing" is specified when the plurality of ambient conditions is "foggy", "cold", and "partly humid" transitioning to "brightening", "warming", and with "falling humidity,"
aggregating the plurality of ambient conditions into at least one ambient environment descriptor based on the obtained user-definable aggregation rules, for associating the ambient environment descriptor with the digital image as metadata, wherein the aggregating includes aggregating variations of the ambient conditions determined over a plurality of times, and enabling a user to search for the digital image based on the at least one ambient environment descriptor.

18. The system of claim 17 wherein the means for determining a plurality of ambient conditions determines variations of the ambient conditions over time by receiving readings of the ambient conditions at a plurality of times including at least one of a time before the time of capture, at the time of capture, and after the time of capture.

19. The system of claim 18 wherein the means for determining a plurality of ambient conditions determines weather-related ambient conditions and non-weather related ambient conditions, wherein the weather-related ambient conditions include any combination of temperature, humidity, barometric pressure, visibility, season, and wind, and the non-weather related ambient conditions include any combination of location, heading, elevation, and brightness level of at least one of the subject and the image capture device.

20. The system of claim 19 wherein the means for determining a plurality of ambient conditions further comprises ambient condition determining means for determining at least one of,
variations of ambient conditions over time at the fixed location of the subject of the digital image, referred to as picture location (PICLOC) data, and
variations of ambient conditions over time at the location of the image capture device, referred to camera location (CAMLOC) data.

21. The system of claim 20 wherein the ambient condition determining means include at least one of,
an ambient conditions site on a network that provides the PICLOC data based on a specified time and location, and sensors in the image capture device for sensing ambient condition values in real-time and for storing the ambient condition as the CAMLOC data.

22. The system of claim 17 wherein the metadata application component includes a user interface for allowing the user to configure the aggregation rules to define the at least one ambient environment descriptor, and to perform searches for the digital image by specifying desired metadata including the at least one ambient environment descriptor.

23. The system of claim 17 wherein the metadata application component aggregates the plurality of ambient conditions into an ambient environment descriptor by,
receiving values for each of the ambient conditions within a specified time period before and after the time of capture; and
for each of the ambient conditions,
summarizing the values of the ambient condition by applying an value descriptor to the ambient condition; and
summarizing changes in the values of the ambient condition by applying a trend descriptor to the ambient condition.

24. A system for automatically generating metadata for a user for a digital image, comprising:
a mobile image capture device for capturing the digital image;
means for determining a plurality of ambient conditions existing at a time related to a time of capture of the digital image and associated with a location of a subject of the digital image device even when the digital image device is in a different location, wherein the means for determining a plurality of ambient conditions determines variations of the ambient conditions over time by receiving readings of the ambient conditions at a plurality of times including at least one of a time before the time of capture, at the time of capture, and after the time of capture; and
a metadata application component for obtaining user-definable aggregation rules for the user, automatically generating the metadata for the digital images by aggregating the plurality of ambient conditions into at least one ambient environment descriptor based on the obtained user-definable aggregation rules, and for associating the ambient environment descriptor with the digital image as metadata, wherein the metadata application component aggregates the plurality of ambient conditions over the plurality of times into an ambient environment descriptor by:
receiving values for each of the ambient conditions within a specified time period before and after the time of capture; and
for each of the ambient conditions:
summarizing the values of the ambient condition by applying an value descriptor to the ambient condition; and
summarizing changes in the values of the ambient condition by applying a trend descriptor to the ambient condition
aggregating related ones of the ambient conditions by,
summarizing the value descriptors applied to the related ambient conditions using the user-definable able rules as lookup table to apply a combination value descriptor; and
summarizing the trend descriptors applied to the related ambient conditions using the user-definable rules as lookup table to apply a combination trend descriptor; and enabling a user to search for the digital image based on the at least one ambient environment descriptor.

25. The system of claim 24 wherein the metadata application component aggregates the plurality of ambient conditions into an ambient environment descriptor by storing at least one of the combination value descriptors and the combination trend descriptors as the image metadata and storing the value descriptors and the trend descriptors for each of the ambient conditions as the image metadata.

26. An executable software product stored on a non-transitory computer-readable medium containing program instructions for automatically generating metadata for a digital image, the program instructions including:
   obtaining user-definable aggregation rules that includes at least one of:
      a rule indicating that "muggy" is specified when a plurality of ambient conditions is "warm" and "very humid";
      a rule indicating that "sweltering" is specified when the plurality of ambient conditions is "hot" and "humid";
      a rule indicating that "balmy" is specified when the plurality of ambient conditions is "mild", "breezy", and "partially humid";
      a rule indicating that "driving rain" is specified when the plurality of ambient conditions is "rainy" and "windy";
      a rule indicating that "monsoon-like" is specified when the plurality of ambient conditions is "warm" and "gusty" and "rainy" and "winds from the South to South-West";
      a rule indicating that "Sudden shower" is specified when the plurality of ambient conditions is "hot" and "humid" transitioning to "cooler" and "rainy"; and
      a rule indicating that "Clearing" is specified when the plurality of ambient conditions is "foggy", "cold", and "partly humid" transitioning to "brightening", "warming", and with "falling humidity";
   determining a plurality of ambient conditions existing at a time related to a time of capture of the digital image and associated with a location of a subject of the digital image captured with a mobile image capture device even when the mobile image capture device is in a different location;
   aggregating the plurality of ambient conditions into at least one ambient environment descriptor based on the obtained user-definable aggregation rules, wherein the aggregating includes aggregating variations of the ambient conditions determined over a plurality of times;
   associating the ambient environment descriptor with the digital image as metadata; and
   enabling the user to search for the digital image based on the ambient environment descriptor.

27. A method for automatically generating and searching metadata for a digital image, comprising:
   determining a plurality of ambient conditions over time at a location of a subject of the digital image captured with a mobile image capture device even when the image capture device is in a different location, the ambient conditions existing at a time related to a time of capture of the digital image;
   aggregating the plurality of ambient conditions into at least one ambient trend descriptor based on user-definable aggregation rules, wherein the aggregating includes aggregating variations of the ambient conditions determined over a plurality of times and the user-definable aggregation rules includes at least one of:
      a rule indicating that "muggy" is specified when the plurality of ambient conditions is "warm" and "very humid";
      a rule indicating that "sweltering" is specified when the plurality of ambient conditions is "hot" and "humid";
      a rule indicating that "balmy" is specified when the plurality of ambient conditions is "mild", "breezy", and "partially humid";
      a rule indicating that "driving rain" is specified when the plurality of ambient conditions is "rainy" and "windy";
      a rule indicating that "monsoon-like" is specified when the plurality of ambient conditions is "warm" and "gusty" and "rainy" and "winds from the South to South-West";
      a rule indicating that "Sudden shower" is specified when the plurality of ambient conditions is "hot" and "humid" transitioninq to "cooler" and "rainy"; and
      a rule indicating that "Clearing" is specified when the plurality of ambient conditions is "foggy", "cold", and "partly humid" transitioning to "brightening", "warming", and with "falling humidity";
   associating the ambient trend descriptor with the digital image as metadata; and
   enabling a user to search for the digital image based on the ambient trend descriptor.

28. A method for searching images based on automatic generation of metadata for a digital image, comprising:
   receiving a search query from a user that includes at least one ambient environment descriptor associated with at least one digital image;
   obtaining the user's user-definable aggregation rules that includes at least one of:
      a rule indicating that "muggy" is specified when a plurality of ambient conditions is "warm" and "very humid";
      a rule indicating that "sweltering" is specified when the plurality of ambient conditions is "hot" and "humid";
      a rule indicating that "balmy" is specified when the plurality of ambient conditions is "mild", "breezy", and "partially humid";
      a rule indicating that "driving rain" is specified when the plurality of ambient conditions is "rainy" and "windy";
      a rule indicating that "monsoon-like" is specified when the plurality of ambient conditions is "warm" and "gusty" and "rainy" and "winds from the South to South-West";
      a rule indicating that "Sudden shower" is specified when the plurality of ambient conditions is "hot" and "humid" transitioning to "cooler" and "rainy"; and
      a rule indicating that "Clearing" is specified when the plurality of ambient conditions is "foggy", "cold", and "partly humid" transitioning to "brightening", "warming", and with "falling humidity";
   evaluating the search query based on the user-definable aggregation rules to retrieve the at least one digital image associated with the at least one ambient environment descriptor; and
   displaying the retrieved at least one image.

29. The method of claim 28, wherein obtaining the user's user-definable aggregation rules comprises:
   obtaining aggregation rules based on the user's demographics; and
wherein evaluating the search query based on the user-definable aggregation rules to retrieve images associated with the at least one ambient environment descriptor comprises evaluating the search query based on the aggregation rules based on the user's demographics to retrieve images associated with the at least one ambient environment descriptor.

30. The method of claim 29 wherein the demographics are defined culturally and geographically 31. The method of claim 29 wherein the aggregations rules are defined specific to an affinity group.

32. The method of claim 28 wherein the user-definable rules include rules defining ambient condition terms including a plurality of terms selected from "warm", "hot", "humid", "very humid", "partially humid", "mild", "breezy", "rainy", "windy", "gusty", "cool", "cold", "warming", "falling", "rising", "steady", "decreasing", and "increasing".

* * * * *